Sept. 14, 1948. L. R. KIRKWOOD ET AL 2,449,169
DEFLECTING CIRCUITS
Filed June 4, 1946
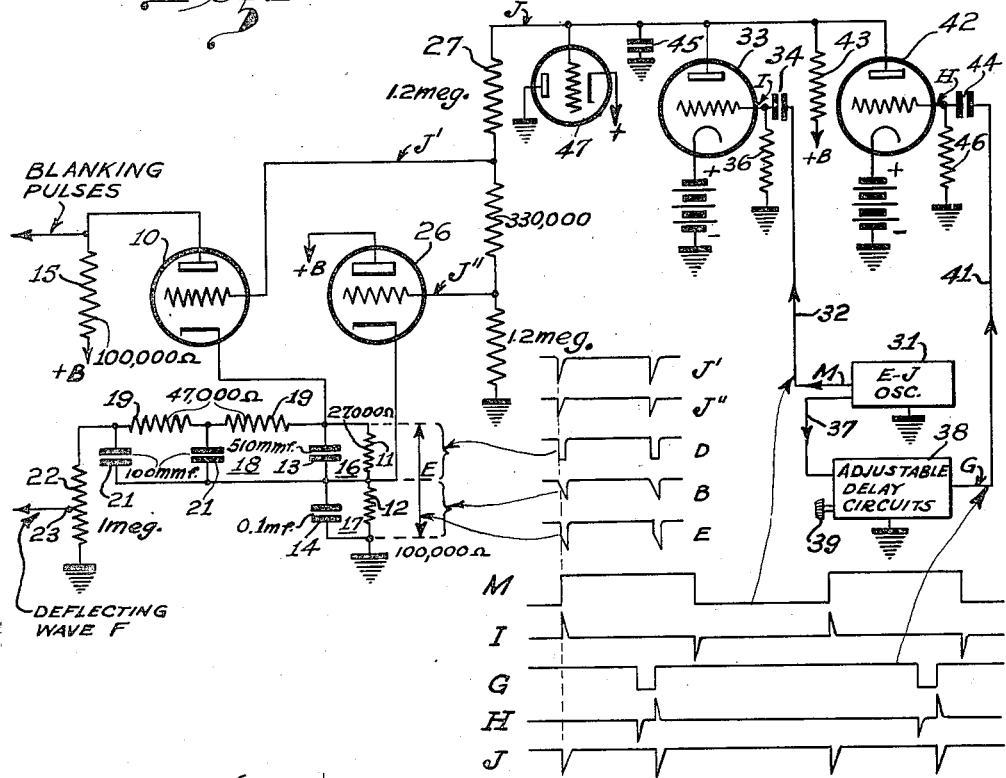
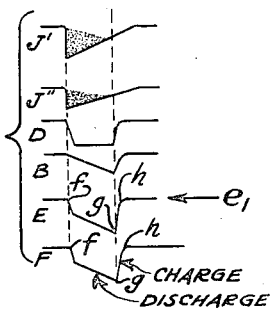
INVENTOR.
Loren R. Kirkwood &
Paul F. G. Holst
BY
*Attorney*

Patented Sept. 14, 1948

2,449,169

UNITED STATES PATENT OFFICE 2,449,169

DEFLECTING CIRCUITS

Loren R. Kirkwood, Oaklyn, N. J., and Paul F. G. Holst, Mount Healthy, Ohio, assignors to Radio Corporation of America, a corporation of Delaware Application June 4, 1946, Serial No. 674,184

11 Claims. (Cl. 250—27)

Our invention relates to cathode-ray deflecting circuits and particularly to the production of deflecting waves which have a fast return line portion and which have a useful deflecting portion that is shaped to produce a cathode-ray trace in which the start of the trace is expanded, thereby increasing the accuracy with which observations may be made during this time interval. The present invention is an improvement over the deflecting circuit described and claimed in copending application Serial No. 583,255, filed March 17, 1945, in the name of George D. Hulst, Jr., and entitled Cathode ray deflection circuit.

Circuits of the above-mentioned type are particularly useful in aircraft or ship radio navigation systems, such as the Loran system, in which radio pulses are received from two ground transmitters and are made to appear on a pair of cathode ray traces where the two pulses are brought into alignment or coincidence. Our copending application Serial No. 682,500, filed July 10, 1946, now Patent Number 2,442,692 and entitled Radio navigation system, shows but does not claim the present invention.

An object of the present invention is to provide an improved method of and means for producing a fast-sweep deflecting wave.

Another object of the invention is to provide an improved circuit for producing a deflecting wave having useful deflecting portions of different slopes.

Still another object of the invention is to provide an improved circuit for producing a deflecting wave having a return-line portion that returns rapidly to a predetermined voltage level.

Still another object of the invention is to provide a substantially square wave time to coincide with the start and the end of the fast-sweep wave for use as a blanking or unblanking signal.

In accordance with the present invention there is a wave shaping network that comprises two network sections having different discharging time constants. During the return-line or retrace period the network sections are charged rapidly to full voltage through separate vacuum tubes. The useful deflection wave portions of different slopes are produced as the network sections discharge.

The invention will be better understood from the following description taken in connection with the accompanying drawing in which Figure 1 is a circuit diagram of an embodiment of the invention together with the principal wave shapes, Figure 2 is a group of graphs that are referred to in explaining the invention, and Figure 3 is an enlarged graph of some of the pulses shown in Figure 1.

Referring to Fig. 1 of the drawing, the circuit comprises a vacuum tube 10 and a shaping network that comprises two sections consisting of cathode resistors 11 and 12 shunted by capacitors 13 and 14, respectively, identified as network sections 16 and 17. The shaping network further comprises a delay line section 18 comprising series resistors 19 and shunt capacitors 21 connected across the network section 16 and terminated in a resistor 22 and in the network section 17. The fast-sweep wave F (Fig. 2) is taken off the resistor 22 through an adjustable tap 23, the setting of which determines the amplitude of the wave F.

The circuit comprises an additional tube 26 that is so connected into the circuit as to greatly improve the recharging characteristic of the circuit. More specifically, referring to the graph E of Fig. 2, the charging portion $g$—$h$ of the wave E immediately following the discharging portion $f$—$g$ is steeper with the present improved circuit than with the circuit of the above-mentioned Hulst application. Thus, the deflecting circuit network is brought to the full charge voltage level $e_1$ in such a short time that it is always charged to the level $e_1$ before a deflecting wave portion such as $f$—$g$ occurs even if the successive deflecting wave portions are separated by only short time intervals.

The vacuum tube 26 has its cathode connected to the junction point of the resistors 11 and 12 so that the capacitor 14 of network 17 may be charged through the tube 26. The anode of the tube 26 is connected directly to the +B voltage. The grids of the tubes 10 and 26 are connected to points on a potentiometer resistor 27 with the grid of the tube 26 connected to a point of slightly lower voltage. A voltage wave J is applied to the resistor 27 with negative polarity and with sufficient amplitude to drive the tubes 10 and 26 rapidly to plate-current cut-off. The voltage waves of different amplitudes appearing on the grids of tubes 10 and 26 are indicated in Fig. 2 as waves J' and J''', respectively. It may be noted that in the absence of the pulses J the grids of the tubes 10 and 26 are less positive with respect to ground than their cathodes; however, the resulting bias is less than that required to bias the tubes to plate current cut-off.

In operation the tube 26 in conjunction with the network 17 produces the lesser slope of the wave portion $f$—$g$ (Fig. 2) and thus provides the slow portion of the sweep. The tube 10 in conjunction with the network 16 produces the steep slope of the wave portion $f$—$g$ for the expanded portion of the sweep. When the negative pulses J are applied to the grids of tubes 10 and 26, both grids are driven beyond the cut-off value during a large portion (indicated by stippling in Fig. 2) of the pulse duration. During the period of cut-off, the tubes 10 and 26 draw no current, and the capacitor of network 17 is discharged through the resistor 12 of this network at a rate determined by the time constant of resistor 12 and capacitor 14. This time constant is long compared to the cut-off interval, and the discharge cycle is interrupted before completion, when the grid of tube 26 returns to its steady state potential, at a value above the cut-off point. The capacitor of network 17 is then recharged through the tube 26 at a much faster rate, determined primarily by the internal resistance of this tube. The voltage wave appearing across the network 17 is shown at B.

The grid of tube 10 receives the pulses J′ which differ from the pulses applied to the tube 26 only by their greater amplitude. The tube 10 also normally draws plate current sufficient to develop a cathode bias through the two resistors of networks 11 and 12 and to charge the capacitor of network 16 to a fixed fraction of the steady state cathode potential. When the negative pulses J′ are applied to the grid of tube 10, the tube 10 is cut off during the part of the pulse duration as indicated by stippling in Fig. 2. During the cut-off period, the capacitor of network 16 discharges through the resistor of this network at a rate determined by the time constant of the capacitor and resistor. As this time constant is short compared to the cut-off period, complete discharge occurs in the early part of this period. No further action occurs until the grid of tube 10 returns to a value above the cut-off point and the tube 10 again draws current. When tube 10 draws current, the capacitor of network 16 is recharged through the tube 10 and its plate resistor 15 to its original potential. The resulting voltage thus developed across the capacitor-resistor network 16 provides the steep portion of the wave $f$—$g$. The voltage wave appearing across the network 16 is shown at D.

Since the capacitor of network 16 discharges during the cut-off period, lowering the cathode potential of tube 26 to a potential equalling that across the capacitor of network 17, which is also varying, the voltage developed at the cathode of the tube 10 is the sum of the voltages appearing across the two networks 16 and 17. This voltage wave, indicated at E, consists of a steeply sloping leading edge, developed by the rapid discharge of the capacitor of network 16 and an abrupt change to a more gradual slope, developed by the discharge of the capacitor of network 17. As the recharge period for both capacitors of networks 16 and 17 begins at approximately the same time, a steeply sloping return swing is imparted to the combined wave as desired.

It may be noted that cut-off occurs at a different level on the negative and positive swings since cathode potential changes during the cut-off period, changing the cathode bias, and placing the point of cut-off at the new level with respect to the grid potential. Due to the difference in the shape of the cathode voltage between the tubes 10 and 26 during cut-off, the change in cut-off value is different for the two tubes, the greater change occurring in tube 10. By applying a larger negative grid pulse to the tube 10 than to the tube 26, this effect is balanced so that the cut-off period for both tubes ends at nearly the same time; but tube 10 is always slightly ahead of tube 26, thus placing tube 10 in control of the length of the sweep.

As used in the navigation system of our above-mentioned copending application, the start of the fast sweep should be delayed slightly with respect to the starting edges of the controlling pulses J. Two resistor-capacitor sections comprising the network 18 provide the means which produces this delay. This network has a frequency response less than that required to pass the high frequency components developed by the abrupt start of the fast-sweep wave. As a result, the wave F which does pass is modified by the network, starts gradually, producing the desired time delay at the start of the steep portion of the wave front. Except for incidental rounding of the other sharp corners, the remainder of the pulse shape is unaffected and is the same as the wave E.

The portion of the circuit for producing the wave J will now be described. It may comprise an Eccles-Jordan oscillator 31 for producing a square wave M which is supplied over a conductor 32 through a differentiating network comprising a capacitor 34 and a resistor 36 to the input circuit of a vacuum tube 33 to produce the wave I.

The wave M is also supplied over a conductor 37 to suitable delay circuits 38 for producing a wave G in which the timing of the back edge may be manually controlled by means of a knob 39, for example. The delay means 38 may comprise one or more multivibrators; it preferably comprises two multivibrators in cascade, one providing a coarse delay and the other providing a fine delay.

The wave G is supplied over a conductor 41 to the input circuit of a vacuum tube 42 through a differentiating network comprising a capacitor 44 and a resistor 46 to produce the wave H. The tubes 33 and 42 have a common plate resistor 43 whereby the input waves of these tubes are combined. The combined waves I and H are widened somewhat by a shunting capacitor 45 and are then clipped by a clipper tube 47 to produce the wave J which comprises successive pairs of pulses, the second pulse of the pair being adjustable in timing. As indicated in Fig. 3, the clipper tube 47 removes the logarithmic tail from the pulses due to the discharge characteristic of capacitor 45 and thus produces the sharp triangular pulses J. As a result, a shorter time interval between successive pulses J is permissible than would otherwise be the case. It will also be noted that the clipping removes the negative pulses present in the waves H and I. The differential mixer tubes 33 and 42 are operated such that the grids are driven more positive than the plates whereby the pulses J in the plate circuit are of equal amplitude even though the input pulses I and H may vary slightly in amplitude. Since the width of the pulses J is controlled by the R—C network in the plate circuit (the network comprising capacitor 45 and the associated circuit) and by the clipper setting, their width is independent of such slight variations in the width of the input pulses I and H as may occur. The resulting uniformity of the pulses J insures a corresponding uniformity and stability of the deflecting wave F.

The present invention makes it possible to make the second pulse of a pair of pulses in the wave J occur very shortly after the first pulse of the pair and still obtain successive fast sweep deflecting waves $f$—$g$ of the deflecting wave E that always return to the preset voltage level $e_1$.

Rectangular pulses coincident with the sweep wave E to be used for blanking or unblanking a cathode ray tube, for example, may be taken off the plate resistor 15 of the tube 10, if desired, since the anode end of resistor goes to maximum +B voltage when the tube 10 is driven to cut-off.

We claim as our invention:

1. A cathode-ray deflection wave circuit comprising a vacuum tube having an anode, a cathode and a control grid, a plurality of resistor-capacitor circuits having different time constants and connected in series with each other, said series connected circuits being connected in series with the cathode-anode impedance of said tube, means for supplying direct current to said circuits through said tube for charging the capacitors of said circuits to a predetermined direct-current potential, a second vacuum tube having an anode, a cathode and a control grid, the cathode of said second tube being connected to a junction point of said series connected resistor-capacitor circuits whereby a portion of said circuits may be charged through said second tube, means for interrupting periodically the flow of charging current through said tubes to said circuits, and means for applying the sum of the voltages that appear across said circuits during said periods of current interruption to a utilization circuit.

2. A cathode ray deflecting circuit comprising two resistors connected in series and two capacitors connected across said two resistors, respectively, to form two wave shaping networks, a vacuum tube having a cathode, a grid and an anode, said resistors being connected in series relation between said cathode and ground, a second vacuum tube having a cathode, a grid and an anode, the cathode of said second tube being connected to the junction point of said resistors, means for supplying anode voltage to said first tube through an anode resistor, means for supplying anode voltage directly to the anode of said second tube, and means for applying similar negative pulses to the grids of said tubes with sufficient amplitude to drive said tubes beyond anode current cut-off whereby said networks are charged through said tubes at the end of each applied pulse and whereby said networks discharge while said tubes are cut off to produce a useful deflecting wave which appears across said two resistors in series.

3. The invention according to claim 2 wherein the wave shaping network located between said junction point and ground has a longer discharging time constant than the other of said wave shaping networks.

4. The invention according to claim 2 wherein means is provided for taking blanking pulses off said anode resistor of the first tube.

5. A cathode-ray deflection wave circuit comprising a plurality of vacuum tubes each having an anode, a cathode and a control grid, a plurality of resistor-capacitor circuits having different time constants and connected in series with each other, said series connected circuits being connected in series with the cathode-anode impedance of one of said tubes, means for charging the capacitors of said circuits to a predetermined direct-current potential including means for charging at least one of said capacitors through the cathode-anode impedance of said one tube and means for charging the rest of said capacitors through the anode-cathode impedance or impedances of the remaining tube or tubes of said plurality of tubes, and means for interrupting periodically the flow of charging current through said plurality of tubes to said capacitors including means for applying to the grids of said tubes periodically recurring negative pulses of sufficient amplitude to drive said tubes periodically to anode current cut-off, and means for applying the sum of the voltages that appear across said circuits to a utilization circuit.

6. A cathode-ray deflection wave circuit comprising two vacuum tubes each having an anode, a cathode and a control grid, two resistor-capacitor circuits having different time constants and connected in series with each other, said series connected circuits being connected in series with the cathode-anode impedance of one of said tubes, means for charging the capacitor of one of said circuits to a predetermined voltage through the cathode-anode impedance of one of said tubes, means for charging the capacitor of the other of said circuits to a predetermined voltage through the anode-cathode impedance of the other of said tubes, means for applying to said grids periodically recurring negative pulses of sufficient amplitude to drive said tubes periodically to anode current cut-off, and means for applying the voltage that appears across said circuits to a utilization circuit.

7. A cathode-ray deflection wave circuit comprising a plurality of vacuum tubes each having an anode, a cathode and a control grid, a plurality of resistor-capacitor circuits having different time constants and connected in series in the cathode circuit of one of said tubes, one of said resistor-capacitor circuits being connected also in the cathode circuit of another of said tubes, each resistor-capacitor circuit comprising a capacitor shunted by a resistor, means including said vacuum tubes for charging the capacitors in the respective cathode circuits of said tubes to a predetermined direct-current voltage through the respective cathode-anode impedances of said tubes, and means for applying to said grids periodically recurring negative pulses of sufficient amplitude to drive said tubes periodically to anode current cut-off whereby said capacitors discharge through their shunting resistors during said cut-off periods, and means for applying the sum of the voltages that appear across said circuits to a utilization circuit.

8. A cathode-ray deflection wave circuit comprising a vacuum tube having an anode, a cathode and a control grid, a plurality of resistor-capacitor circuits having different time constants and connected in series with each other, said series connected circuits being connected in series with the cathode-anode impedance of said tube, means for supplying direct-current to said circuits through said tube for charging the capacitors of said circuits to a predetermined direct-current potential, means for interrupting periodically the flow of charging current through said tube to said circuits, and means for applying the sum of the voltages that appear across said circuits during said periods of current interruption to a utilization circuit, said means for interrupting periodically the flow of charging current comprising means for producing a first group of periodically recurring pulses, means for producing a second group of periodically recurring pulses that are displaced in phase with respect to said first group, a pair of vacuum tubes having input electrodes to which said first and second groups of pulses are applied, respectively, said pair of tubes having a common output resistor whereby said first and second group of pulses are combined, means for clipping said combined pulses to produce triangular pulses and means for applying them to the control grid of the first-mentioned vacuum tube.

9. A cathode-ray deflection wave circuit comprising a vacuum tube having an anode, a cathode and a control grid, a plurality of resistor-capacitor circuits having different time constants and connected in series with each other, said series connected circuits being connected in series with the cathode-anode impedance of said tube, means for supplying direct current to said circuits through said tube for charging the capacitors of said circuits to a predetermined direct-current potential, means for interrupting periodically the flow of charging current through said tube to said circuits, and means for applying the sum of the voltages that appear across said circuits during said periods of current interruption to a utilization circuit, said means for interrupting periodically the flow of charging current comprising means for producing a first group of periodically recurring pulses, means for producing a second group of periodically recurring pulses that are displaced in phase with respect to said first group, a pair of vacuum tubes having input electrodes to which said first and second groups of pulses are applied, respectively, said pair of tubes having a common output resistor whereby said first and second group of pulses are combined, a direct-current connection from said output resistor to the control grid of the first-mentioned vacuum tube, and a clipping diode connected between said direct-current connection and ground.

10. A cathode-ray deflection wave circuit comprising a vacuum tube having an anode, a cathode and a control grid, a plurality of resistor-capacitor circuits having different time constants and connected in series with each other, said series connected circuits being connected in series with the cathode-anode impedance of said tube, means for supplying direct current to said circuits through said tube for charging the capacitors of said circuits to a predetermined direct-current potential, means for interrupting periodically the flow of charging current through said tube to said circuits, and means for applying the sum of the voltages that appear across said circuits during said periods of current interruption to a utilization circuit, said means for interrupting periodically the flow of charging current comprising means for producing a first group of periodically recurring pulses, means for producing a second group of periodically recurring pulses that are displaced in phase with respect to said first group, a pair of vacuum tubes having input electrodes to which said first and second groups of pulses are applied, respectively, said pair of tubes having a common output resistor whereby said first and second group of pulses are combined, a direct-current connection from said output resistor to the control grid of the first-mentioned vacuum tube, a capacitor connected between said direct-current connection and ground to widen said pulses, and a clipping diode connected between said direct-current connection and ground.

11. A cathode-ray deflection wave circuit comprising a vacuum tube having an anode, a cathode and a control grid, a plurality of resistor-capacitor circuits having different time constants and connected in series with each other, said series connected circuits being connected in series with the cathode-anode impedance of said tube, means for supplying direct current to said circuits through said tube for charging the capacitors of said circuits to a predetermined direct-current potential, a second vacuum tube having an anode, a cathode and a control grid, the cathode of said second tube being connected to a junction point of said series connected resistor-capacitor circuits whereby a portion of said circuits may be charged through said second tube, means for interrupting periodically the flow of charging current through said tubes to said circuits, and means for applying the sum of the voltages that appear across said circuits during said periods of current interruption to a utilization circuit, said means for interrupting periodically the flow of charging current comprising means for producing a first group of periodically recurring pulses, means for producing a second group of periodically recurring pulses that are displaced in phase with respect to said first group, a pair of vacuum tubes having input electrodes to which said first and second groups of pulses are applied, respectively, said pair of tubes having a common output resistor whereby said first and second group of pulses are combined, a direct-current connection from said output resistor to the control grids of the first and second vacuum tubes, and a clipping diode connected between said direct-current connection and ground.

LOREN R. KIRKWOOD.
PAUL F. G. HOLST.

REFERENCES CITED

The following references are of record in the file of this patent:

UNITED STATES PATENTS

| Number | Name | Date |
| --- | --- | --- |
| 2,222,426 | White | Nov. 19, 1940 |
| 2,282,104 | Tunick | May 5, 1942 |
| 2,282,105 | Tunick | May 5, 1942 |
| 2,366,307 | Anderson | Jan. 2, 1945 |